United States Patent Office 3,061,826
Patented Oct. 30, 1962

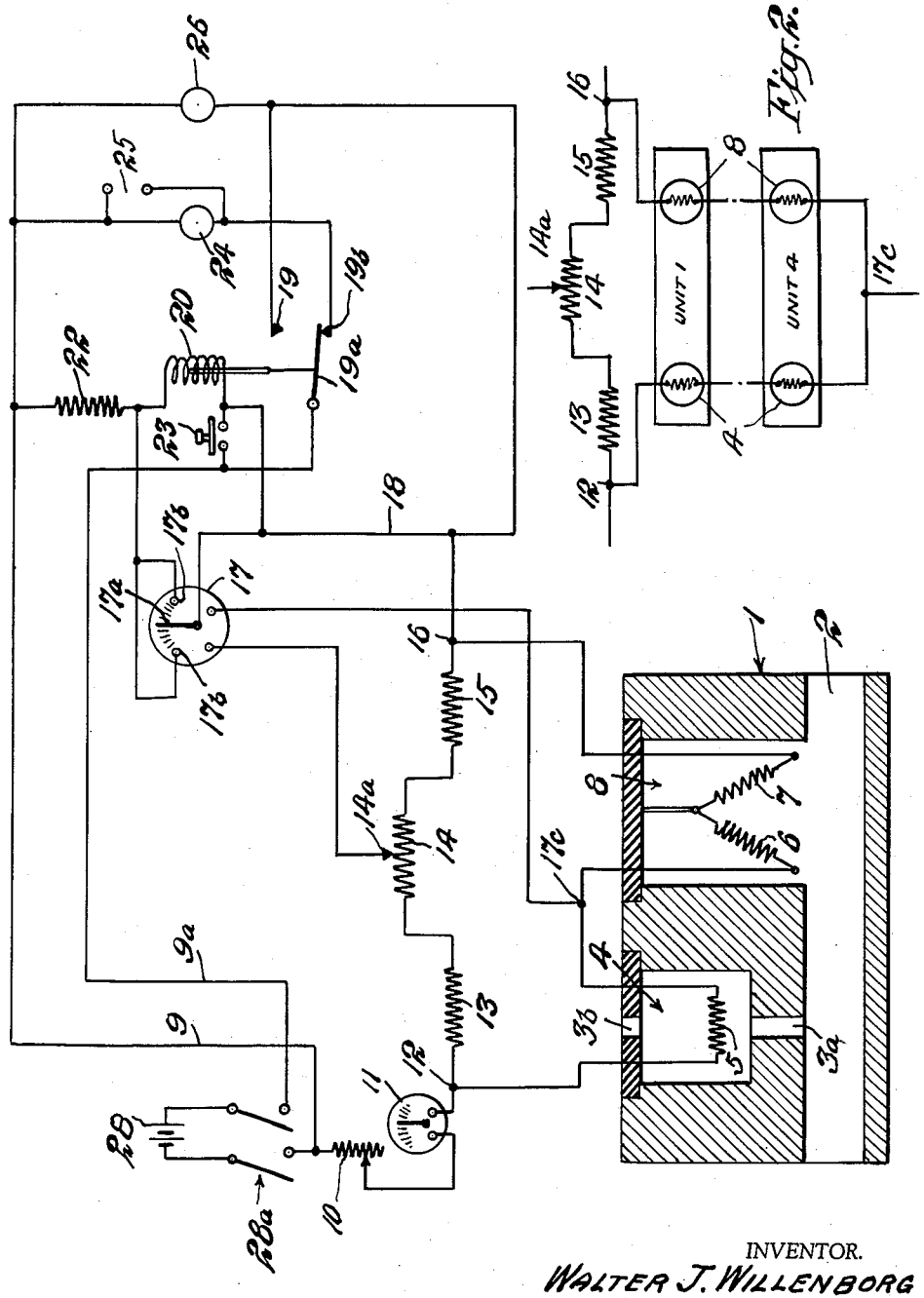

3,061,826
FLAMMABLE VAPOR DETECTOR
Walter J. Willenborg, Weehawken, N.J., assignor to Jabez Burns & Sons, Inc., New York, N.Y., a corporation of New York
Filed Apr. 29, 1957, Ser. No. 655,734
1 Claim. (Cl. 340—237)

This invention relates to the detection of flammable vapors and particularly to the detection of flammable vapors which may be flowing at high velocities.

One of the objects of the invention is to rapidly and accurately detect the presence of flammable vapors or gases moving at high velocities.

Another object of the invention is to rapidly and accurately detect the presence of flammable vapors or gases either at rest or moving at high velocities without adjustment of the detecting apparatus for the different velocities of movement.

Another object of the invention is to adapt the detecting apparatus to variations in ambient temperature and humidity at different atmospheric pressures.

Other and further objects will become apparent from the description taken in connection with the drawings, illustrating a schematic view of the control circuit and detecting elements in detail in FIG. 1 and a diagrammatic view of a plurality of detector units connected to a single indicator in FIG. 2.

In my Patent No. 2,533,339, issued on December 12, 1950, the catalytic-type resistor for detecting the presence of flammable gases and vapors, such as alcohol, ethylene and hydrogen in oxygen, is fully described. These resistors are preferably made of platinum, or other material which is catalytically active. The catalytic resistors have a positive temperature coefficient of resistance and when heated to a temperature of at least 85° C., the resistance increases in the presence of flammable gases or vapors. This increase in resistance is sufficient, even for a small percentage variation in flammable gases and vapors, to unbalance a Wheatstone bridge circuit and produce an indication of the increase. The catalytic action increases in sensitivity as the temperature of the resistor increases. Thus, in the presence of the vapors and gases the resistor increases in sensitivity to detect them.

In this invention a catalytic detector in combination with non-catalytic material is used to detect flammable vapors and gases which may be moving at high velocities or which may be at rest or moving slowly and responds correctly to variations in ambient temperatures as well as differences in atmospheric pressure and humidity. In each of these applications the detector is sensitive and accurate in detecting the presence of the vapors and gases without requiring the adjustment of the apparatus for the differences in conditions.

The detector cell comprises a cell block 1, which may be made of a metallic or a non-metallic material. The cell unit is provided with chambers 4 and 8 for housing resistor unit 5, and resistors 6 and 7, respectively. The detector unit is connected with the space containing the gaseous mixture to be detected by a passage 2. The chamber 4 has a passage 3a connecting the chamber to the passage 2 and another opening 3b to permit the diffusion of the vapors and gases therethrough, so that the physical condition of the resistor 5 will be responsive to the variations in pressure of the gaseous mixture. The opening 3a may be larger or smaller, and may be as large as the opening to chamber 8, depending on the service for which the detector is to be used. The chamber 8 is directly connected to the passage 2 so that the elements 6 and 7 are in direct communication with the flow of the gases and vapors. Thus, as the proportions of the vapors within the mixture change, they are brought into direct contact with the resistors 6 and 7 so that any change in these proportions is immediately detected by these elements. The resistive elements 6 and 7 may be formed as straight wires, or curled or zig-zagged, depending upon the material used and the amount of surface of the wire to be exposed. In this embodiment the resistor 6 is a straight catalytic wire and the resistor 7 is a curled tungsten wire suspended in a V-shape to accommodate the wire to the chamber 8. The resistor 7 does not necessarily have the same resistance as the resistor 6 and can be more or less in resistance, depending on the service for which the detector is designed. The resistors 5, 6 and 7 are connected in a Wheatstone bridge circuit with resistors 13, 14 and 15. The resistors 13, 14 and 15 are resistors of fixed characteristics, unaffected by temperature, humidity, pressure or the gaseous mixtures to be detected. The resistor 5 is a non-catalytic resistor responsive to temperature, humidity and atmospheric changes in a manner similar to the resistors 6 and 7. Resistor 5 is equal in resistance to the sum of the resistors 6 and 7. The resistor 5 forms one leg of the bridge and the series connected resistors 6 and 7 form the other leg. The resistor 5 compensates for and adjusts the balance of the Wheatstone bridge upon variations in the physical state of the gaseous mixture.

The resistor 6 is of the catalytic type, preferably made of platinum, palladium, rhodium, various alloys thereof, or other compositions of metals to which promoters have been added for securing or increasing their catalytic action. Such catalysts vary in their effective action in the presence of various types of flammablbe vapors or gases and selection may be made for the service for which the detector is designed. The resistor 6 is responsive as previously described herein. The resistor 7 is a non-catalytic resistor having substantially the same resistance as the catalytic resistor 6. Resistor 7 is preferably made of coiled tungsten wire, but may be made of a non-catalytic wire having a positive temperature coefficient.

Since resistors 6 and 7 are in series, the current passing through resistor 6 passes through resistor 7 and the two resistors act as a single detecting unit insofar as the Wheatstone bridge is concerned. These two resistors in series compensate for the cooling effect of the high velocity flow of the gaseous mixture. The only condition that unbalances the bridge is a variation in the proportions of the flammable vapors in the gaseous mixture. With current passing through the resistors 6 and 7, an increase in flow will change the temperature of the resistor 6. This occurs when resistor 7 decreases in resistance due to cooling by the rapid air flow. The catalytic resistor 6 responds to the decrease in the resistor 7 by heating and increasing in resistance to maintain the balance of the bridge and the temperature of the resistor within the catalytic active range.

The indicating and controlling apparatus shown in the drawing will now be described. A direct current source 28, shown as a battery, supplies current through a manually operated switch 28a to the lines 9 and 9a. A lead from the line 9 passes to a variable resistive device 10 and then to a milli-ammeter 11 from which a connection extends to a bridge circuit such as a Wheatstone bridge. One side of the bridge from the point 12 comprises the resistor 13, the variable balancing resistor 14 and the resistor 15 to the point 16. The other side of the bridge from the point 12 comprises the resistor 5, series resistors 6 and 7 and then to the point 16. Resistor 5 is substantially equal to the sum of the resistors 6 and 7. A contacting type galvanometer 17 is connected from the contact 14a of the variable resistor 14 to the point 17c in the connection between the resistors 5 and 6. The galvanometer will therefore indicate from its zero central indicating position any unbalancing of the bridge circuit. The adjustable resistor 14 is provided for securing a zero reading of the instrument 17 when no flammable vapors or gases are present in the cell unit or for any selected condition. The return connection from the point 16 of the bridge to the source is made by a lead wire 18 to a fixed contact 19 and then through a movable contact 19a to the supply line 9a. An electromagnet, indicated for simplicity as a solenoid, has a controlling winding 20 for affecting the position of is movable contact 19a. This winding is connected in series with a resistor 22 from supply line 9 to the fixed contact 19. A push button switch 23 is adapted to energize the magnet winding when temporarily closed by a circuit from line 9, resistor 22, winding 20, switch 23 and then to line 9a. The movable vane 17a of the galvanometer 17 is electrically connected to one terminal of the winding 20, the other terminal being connected to both of the fixed galvanometer contacts 17b engaged at the limiting positions of the vane 17a. When either of the contacts 17b is engaged by the vane, the winding 20 is de-energized.

When the winding 20 is not excited, its movable contact 19a engages a fixed contact 19b. From this contact extends a connection to a red signal light 24 connected in parallel with terminals 25 for purposes such as an alarm signal, if desired, to the line 9. A green signal light 26 is connected from the line 9 to the fixed contact 19.

The drawing in FIG. 1 shows the parts in their inoperative condition. Operative conditions are secured by first closing the switch 28a. The switch then supplies current to the danger signal 24 through the contacts 19a and 19b. The push button switch 23 is then closed momentarily which excites the winding 20 through the circuit already explained. The magnet then moves its contact 19a to disengage the contact 19b and engage the contact 19. This opens the circuit to the light 24 and closes the circuit through the safety light 26. It also closes a holding circuit of the winding 20 from line 9 through resistor 22, winding 20, wire 18 and contacts 19 and 19a to line 9a which maintains the winding energized after the push button switch is opened.

The energization of the magnet winding also closes the bridge circuit by the closing of the contacts 19 and 19a by a circuit from line 9, adjustable resistor 10, ammeter 11, through the bridge circuit to lead wire 18, and contacts 19 and 19a to line 9a. The device 10 is then adjusted to cause sufficient current to pass through the bridge circuit to bring the temperature of the filament or resistor 6 to at least 85° C. to insure that this filament will act catalytically in the presence of flammable vapors or gases. The value of the current supplied to the bridge for this purpose is predetermined, which enables the operator to adjust the resistive device 10 until the reading of the milli-ammeter 11 gives the required current.

In case flammable vapors or gases together with air or oxygen are present within the enclosure, which may be remote from the indicating and control apparatus, the resistor 6 will act as a catalyst which in turn causes the heating of the resistor and an increase in its resistance. This unbalances the bridge circuit because the resistor 5 is unaffected, which results in the vane or pointer 17a being moved say to the right a certain amount and thereby indicates the presence of the flammable vapors or gasese; and any increase in the presence thereof cause a corresponding further deflection of the pointer 17a to the right. The right-hand fixed contact 17b is adjusted at a position such that when the presence of such vapors or gases approaches dangerous condition, the vane 17a will engage the right-hand contact 17b. This, as already explained by the circuit connections will short-circuit the winding 20 and de-energize it. The movable contact 19a then moves to the position shown in the drawing which opens the circuit to the safety light 26 and closes the circuit to the danger light 24 and opens the circuit to the bridge. After the approach to a dangerous condition is overcome, the operator will close the push button switch 23 to again place the apparatus in protective condition.

The automatic de-energization of the control winding 20 when a dangerous condition is approached also serves to open the bridge circuit at the contacts 19 and 19a which results in cutting off the supply of heating current to the resistor or filament. This avoids the possibility of the element 6 being further heated which, if continued, might reach a glowing condition and cause an explosion or fire if the presence of the flammable vapors or gases were permitted to increase. By the automatic opening of the circuit to the detector 6, as above explained, there is protection against its becoming overheated. A mesh screen, for certain applications of the detector, can be placed at the opening of the chamber 8 into the passage 2 and also at any opening in the top of the chamber 8 to reduce any hazard should the resistor element 6 by some chance reach an ignition or glowing temperature for the gases and vapors being tested. However, by the automatic opening of the bridge circuit as above explained, the protection against the resistor element 6 becoming overheated is accomplished.

In case any of the resistors 5, 6, 7, 13, 14 or 15 in the two sides of the bridge circuit should become defective, as by open circuiting, the vane 17a would be moved to engage one or the other of the fixed contacts 17b due to the unbalancing of the bridge circuit and thereby de-energize the magnet winding to give an alarm indication and disconnect the bridge circuit from the source until the defective resistor is replaced.

As seen from the above description the detector unit is universal in its application and location. It may be placed where the vapors are at rest or moving at low velocities or where the gas mixture is flowing at a high velocity and it will still detect the presence of dangerous proportions of flammable vapors with accuracy. The detector unit may also be located where the ambient temperatures vary over a wide range, from temperatures below 0° C. to temperatures at the operative temperature of the catalytic element.

As illustrated in FIG. 2, a plurality of detection units may be connected across the Wheatstone bridge. The series combination of the catalytic and non-catalytic element of each of the units is connected in series between terminal 16 and terminal 17c and the ambient non-catalytic elements 5 are connected in series between the terminals 17c and 12. Each of the units may be positioned at a different location and on currents of a dangerous proportion of flammable vapors at any detector unit, the element circuit will be actuated.

Although the cell detection unit has been shown in a specific embodiment, various modifications and changes may be made without departing from the invention as set forth in the appended claim.

I claim:

In a protective apparatus having a balanced bridge type circuit for detecting the presence of flammable vapor and gas mixtures, a detector unit comprising the combination of a catalytic element and a first non-catalytic element in series forming one leg of the bridge and a second non-catalytic element in the leg adjacent thereto having an initial resistance substantially equal to the combined resistance of the catalytic element and the first non-catalytic element, said second non-catalytic element exposed to the vapor and gas mixtures to compensate said bridge in respect to ambient conditions, and said catalytic element being of a character to create an elevated temperature within said catalytic element and an increase in resistance on an increase in flammable vapors to provide for the detection of dangerous proportions, said first non-catalytic element having an initial resistance generally equal to the catalytic element and decreasing in resistance on a cooling flow of vapors over said elements to create heat within the catalytic element thus increasing the resistance of the catalytic element to maintain the bridge, in cooperation with the second non-catalytic element, in balance for detecting dangerous proportions of flammable vapors moving at high velocities.

References Cited in the file of this patent

UNITED STATES PATENTS

| | | |
|---|---|---|
| 2,399,965 | Weber | May 7, 1946 |
| 2,514,690 | Bliss et al. | July 11, 1950 |
| 2,533,339 | Willenborg | Dec. 12, 1950 |
| 2,535,950 | Page | Dec. 26, 1950 |
| 2,657,353 | Wianchko | Oct. 27, 1953 |
| 2,764,731 | Koerner | Sept. 25, 1956 |
| 2,782,102 | Howe | Feb. 19, 1957 |
| 2,787,904 | Beard | Apr. 9, 1957 |
| 2,817,229 | Beard | Dec. 24, 1957 |
| 2,857,251 | Krogh | Oct. 21, 1958 |
| 2,879,142 | Jones | Mar. 24, 1959 |
| 2,883,270 | Johnson | Apr. 21, 1959 |
| 2,928,276 | Beard | Mar. 15, 1960 |

FOREIGN PATENTS

| | | |
|---|---|---|
| 759,962 | Great Britain | Oct. 24, 1956 |